Patented May 1, 1928.

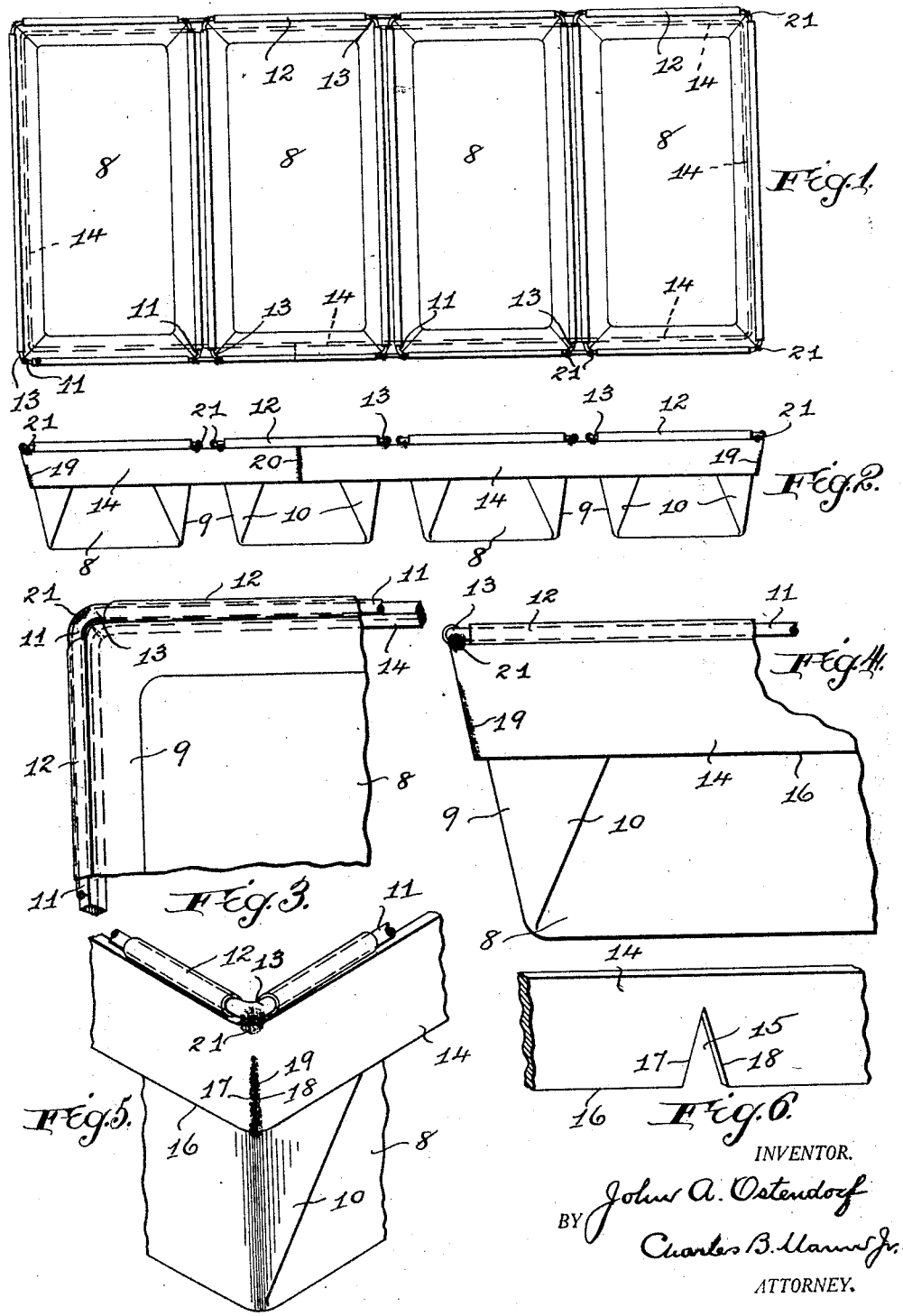
May 1, 1928.
J. A. OSTENDORF
BAKE PAN
Filed Jan. 10, 1927
1,668,332
INVENTOR.
John A. Ostendorf
BY Charles B. Mann Jr.
ATTORNEY.

1,668,332

UNITED STATES PATENT OFFICE.

JOHN A. OSTENDORF, OF BALTIMORE, MARYLAND, ASSIGNOR OF ONE-HALF TO EUGENE P. MARTIN, OF BALTIMORE, MARYLAND.

BAKE PAN.

Application filed January 10, 1927. Serial No. 160,018.

This invention relates to improvements in bake pans and has particular reference to an improved construction of grouped pans which are bound together to form sets such as are commonly employed in bakeries where bread is baked in large quantity.

Bake pan sets have been formed in several ways by means of rods or strap iron extending about the pans and riveted thereto or by curling the upper edges of the pan walls over the rods, and while some of these forms are in use today, they are expensive, mainly because of the numerous operations necessary in preparing for rivets, placing those rivets and then up-setting the rivets.

The object of my invention is to provide an improved construction of bake pan set which avoids the use of rivets and the operations necessary to handle them; which avoids the use of rods around which the edges of the pan walls are curled and which provides a stronger and more durable pan set.

The invention is illustrated in the accompanying drawing wherein,—

Fig. 1, shows a set of pans in top view embodying my invention.

Fig. 2, illustrates the same in side elevation.

Fig. 3, shows a fragment of a corner pan of the set on an enlarged scale together with the pan-wiring and a portion of the metal connecting strap.

Fig. 4, illustrates an end view of a portion of a corner pan of the set showing the pan and strap band in side elevation.

Fig. 5, shows an enlarged perspective detail of a corner of the pan set, and

Fig. 6, illustrates a fragment of the detached strap-band with its notched edge showing how the band is prepared prior to its attachment to the pans.

Referring to the drawing the numeral 8 designates a series of bake pans each of a well-known construction in itself and having tapered walls 9 and end-folds 10, by which the tapered effect is produced.

These pans 8 are separately reinforced around their top-edges by wire 11 around which the upper edges of the pan walls are rolled or curled as at 12 as is usual and common.

The wiring of these pans leaves the wire exposed at the four corners 13 of each pan and I propose to utilize these exposed corners as will presently be explained.

I also make use of strap iron 14 under the upper edges of the pans of the set and while it is common to place straps or bands at this point I do so in a novel and advantageous manner.

In view of the fact that the pans have flared or inclined walls the strap or band embracing the set of pans should also be flared, and I accomplish this in a novel manner.

In carrying out my invention, knowing the rectangular outside dimension of the group of pans that are to form the set and also knowing the angle at which the side and end walls of the pans are flared, I prepare a strip or band of strap-iron 14, of the desired length, width and thickness, and I cut out V-notches 15, in that strap-iron, which notches extend from the bottom edge 16 of the strap upwardly,—the notches being of an inverted V-shape with the wider portions at the said bottom edge of the strap.

These notches 15, are so spaced along the strap as to cause them to register with the four corners of the set of pans when the strap is folded or bent at a right angle at each V-notch.

When folding the strap at the notches I desire to contract the lower edge without, however, producing a similar contraction at the upper edge so as to impart the desired flare to the strap in a vertical direction and have that flare conform to the flare of the pan walls.

By thus notching and then bringing the notched edges 17 and 18 together I produce the desired flare in the strap.

After, or during the bending operation, but after the edges 17 and 18 of the notches are brought substantially together I weld those edges as indicated at 19 in the drawing, and permanently hold the band or strap in the flared condition.

The two ends of the strap are then welded at 20, thus completing a substantially rectangular strap-frame which is flared so as to be larger around the top than around the bottom-edge.

The pans 8 are then assembled in a group or set, in this instance a set of four pans, with their bottoms uppermost and the rectangular strap or band is laid over the set with the larger side of the flare next to the curled and wired edges of the pans.

The flare of the strap and the flare of the pan walls are sufficiently alike to enable the pans to fit snugly within the strap or band and the assembled pans and strap are then ready to be permanently secured together.

I then present the assembled structure to a spot-welding machine and at the corner 13 of each pan where the edge-wiring 12 is exposed, I clamp that wiring and the edge of the strap 14 close together with the electrodes of the spot-welder and instantly weld the wire and strap together at the spots 21, with the result that each pan is spot-welded to the strap at four points.

It is to be noted that when the rectangular strap is forced onto the tapered walls of the set of pans that said strap will be flat against the end-folds 10 of the pans and clamp those folds close against the ends of the pans thus avoiding the necessity of otherwise securing those folds against the pan-ends.

The welding of each pan and strap at four points makes an exceedingly simple and strong structure; avoids marks or impressions on the inside of the pans such as are present when rivets are used and entirely avoids the time and operations of preparing the pans to receive rivets or other fastenings thereby materially decreasing the cost of manufacture.

Having described my invention, I claim,—

1. A bake pan set comprising a plurality of rectangular bake pans with tapered walls of a metal band having notched and drawn-together edges to produce a flare therein,— said flared band extending about the set of pans directly beneath their upper edges and the corner of each pan directly over the flared band being secured to the band-edge by a fusion of metal to permanently connect the pans to the band.

2. A bake pan set comprising a plurality of individual rectangular tapered-wall bake pans each individual pan having an out-turned wired upper edge and the wire of each pan being exposed at each corner of its pan, a metal band extending about all of the pans of the set immediately beneath the wired edges thereof and the exposed wire at each corner of the pan being secured to the upper edge of the metal band by spot welding them together.

3. A bake pan set comprising a plurality of rectangular bake pans each individual pan of the set having the upper edges of its side and end walls rolled around a reinforcing wire which wires are exposed at the four corners of each individual pan, a metal band extending along the opposite ends of the set of pans with its top edge passing under the exposed reinforcing wires at the corners of the pans and the exposed portion of said wires at the corners of the pans being secured to the top edge of the metal band beneath it by a fusion of metal at said corners.

In testimony whereof I affix my signature.

JOHN A. OSTENDORF.